(12) United States Patent
Murakami et al.

(10) Patent No.: US 7,836,592 B2
(45) Date of Patent: Nov. 23, 2010

(54) METHOD OF PRODUCING CONNECTING ROD WITH BEARING

(75) Inventors: Hideki Murakami, Toyota (JP); Takeshi Shinoda, Nagoya (JP); Keishi Nanbu, Aichi (JP)

(73) Assignee: Japan Science and Technology Agency, Saitama (JP)

( * ) Notice: Subject to any disclaimer, the term of this patent is extended or adjusted under 35 U.S.C. 154(b) by 688 days.

(21) Appl. No.: 11/791,906

(22) PCT Filed: Nov. 29, 2005

(86) PCT No.: PCT/JP2005/021874

§ 371 (c)(1),
(2), (4) Date: May 30, 2007

(87) PCT Pub. No.: WO2006/059595

PCT Pub. Date: Jun. 8, 2006

(65) Prior Publication Data

US 2008/0216599 A1 Sep. 11, 2008

(30) Foreign Application Priority Data

Nov. 30, 2004 (JP) ............................. 2004-346962

(51) Int. Cl.
*B21D 53/84* (2006.01)
(52) U.S. Cl. .............................. 29/888.091; 29/888.09; 29/888.092; 74/579 R; 74/594
(58) Field of Classification Search ............. 29/888.09, 29/888.091, 888.092; 74/594, 579 R
See application file for complete search history.

(56) References Cited

U.S. PATENT DOCUMENTS 5,941,651 A * 8/1999 Di Serio .................. 403/279

FOREIGN PATENT DOCUMENTS

| JP | 58-82632 | 5/1983 |
|---|---|---|
| JP | 63-45451 | 2/1988 |
| JP | 5-44842 | 2/1993 |
| JP | 9-137202 | 5/1997 |
| JP | 9-222117 | 8/1997 |
| JP | 2000-15718 | 1/2000 |
| JP | 2000-312981 | 11/2000 |
| JP | 2002-1664 | 1/2002 |
| JP | 2002-327732 | 11/2002 |
| JP | 2004-308819 | 11/2004 |

* cited by examiner

*Primary Examiner*—Rick K Chang
(74) *Attorney, Agent, or Firm*—Jordan and Hamburg LLP (57) ABSTRACT

A method of producing a connecting rod with a bearing, in which both a process for producing a bearing separately from a connecting rod and a process for assembling the bearing to the connecting rod can be eliminated to reduce processes, labor, and costs to produce the connecting rod. A hollow cylindrical molding of a bearing metal material is inserted and fitted, as an inner member, inside an inner surface of a circular large end hole of a large end section of a connecting rod. A tapered surface of a rotary pressing tool is pressed, while rotating, to the hollow cylindrical molding to heat and soften the hollow cylindrical molding, causing the hollow cylindrical molding of the bearing metal material to plastically flow axially and radially outward, whereby a bearing metal layer is directly joined and formed on the inner surface of the large end hole.

2 Claims, 9 Drawing Sheets

$$\frac{t_1}{t_0} \times 100 = \text{DRAFT (\%)}$$

FIG. 6(A) PRESSURE CONTROL METHOD

FIG. 6(B) DISPLACEMENT VELOCITY CONTROL METHOD

FIG. 6(C) PRESSURE-AND-VELOCITY MIXTURE CONTROL METHOD

METHOD OF PRODUCING CONNECTING ROD WITH BEARING

The present invention relates to a method of producing a connecting rod with a bearing or bearings, and also relates to a connecting rod with a bearing or bearings.

A connecting rod that connects a piston, and a crank shaft, of an engine of a vehicle to each other includes a large end portion on the side of the crank shaft, a small end portion on the side of the piston, and a rod portion located between the two end portions. The small end portion has a circular fitting hole (i.e., a small end hole) in which a piston pin rotatably fits for connection; and the large end portion has a fitting hole (i.e., a large end hole) in which a crank pin rotatably fits for connection.

A con rod bearing that has, as a whole, a cylindrical shape is assembled with an inner surface of each of the respective fitting holes of the large and small end portions of the connecting rod, and the crank pin and the piston pin rotatably fit, for connection, in the respective fitting holes via the respective con rod bearings.

In a conventional method, the above-mentioned con rod bearings are beforehand produced separately from the connecting rod, and then are assembled with the respective inner surfaces of the two fitting holes. In this state, the large and small end portions of the connecting rod are connected to the crank pin and the piston pin, respectively, via the respective con rod bearings.

Each con rod bearing is produced by joining a bearing metal (i.e., an alloy) having a thickness of about 0.3 mm, to a thin plate that is a so-called back metal and is provided by a cold-finished hoop having a thickness of about 1.5 mm. That is, the production of each con rod bearing needs complicated steps including (1) a step of casting the bearing metal, (2) a step of working the bearing metal into a thin plate, (3) a step of making the back metal and the bearing metal into a clad, and (4) a step of machining the clad. Thus, the production of each con rod bearing needs much labor, time and cost. In addition, when the con rod bearings are assembled with the connecting rod, high accuracy is required. Thus, the con rod bearings need to be handled with care.

More specifically explained, when the con rod bearings are assembled with the connecting rod, foreign matters may enter clearances therebetween, or the problem of accuracy of those clearances may occur. Thus, the assembling of the con rod bearings involves difficulty and care. Moreover, there is another problem that the con rod bearings may be damaged due to seizer, fatigue, rotation with the pins, or fretting (i.e., a phenomenon that small vibrations occur, the outer diameters of the con rod bearings and/or the inner surfaces of the fitting holes of the connecting rod are worn, and the bearings are damaged by the power produced by the wearing).

Meanwhile, it has been proposed to coat, by spraying, the respective inner surfaces of the fitting holes of the connecting rod with a bearing metal material and thereby form respective bearing metal layers (i.e., respective bearings) on the respective inner surfaces of the fitting holes. However, in the case where the spraying method is used, if the material of the connecting rod is defective, a degree of bonding of the bearings to the connecting rod may lower. In addition, since the bearing metal layers formed by the spraying method are not fused with the material of the connecting rod, the metal layers suffer a low peel strength.

Moreover, when the bearing metal layers are formed by the spraying method, a spraying gun cannot be inserted into the fitting hole (i.e., the small end hole) of the small end portion of the connecting rod and accordingly cannot help spaying the bearing metal material in an oblique direction, which leads to lowering the bonding strength of the bearing metal layers and even causing peeling or breaking of the same.

Patent Document 1, identified below, discloses an invention related to a slide-bearing structure. In the disclosed invention, a con rod bearing is constituted by a back metal and a bearing metal, and an outer circumferential surface of the back metal is subjected to, e.g., a shot peening so as to improve a degree of hardness thereof and reduce, e.g., wearing of the con rod bearing due to fretting.

However, in the above-mentioned invention, the con rod bearings are produced, in advance, separately from the connecting rod, and then are assembled with the connecting rod. In this respect, the prior invention differs from the present invention.

Patent Document 2 discloses an invention related to a method of producing a connecting rod with a bearing. In the disclosed invention, ring-like bearing metals are fitted in fitting holes of a connecting-rod formed body integral with a cap, and then are sintered so that the bearing metals are infiltrated with the fitting holes, and subsequently the cap portion is cut off. However, in the disclosed invention, the ring-like bearing metals are produced, in advance, separately from the connecting rod, and then are assembled with, and joined with, the fitting holes of connecting rod. Thus, the prior invention differs from the present invention.

Patent Document 1:
Japanese Patent Application Publication 9-222117
Patent Document 2:
Japanese Patent Application Publication 9-137202

In the above-described background, the present invention has been developed, and it is therefore an object of the present invention to provide a method of producing a connecting rod with a bearing, and a connecting rod with a bearing, each of which does not need a step of producing bearings separately from a connecting rod or a step of assembling the bearings with the connecting rod, so as to reduce steps, labor, and cost that are needed to produce the connecting rod with the bearing and solve the above-indicated various problems caused by the fact that the bearings are separate from the connecting rod.

SUMMARY OF THE INVENTION

According to the main aspect of the invention, there is provided a method of producing a connecting rod with a bearing or bearings which a cylindrical formed body which is formed, in advance, of a bearing metal material into a cylindrical shape having a cross-sectional shape corresponding to a circular inner surface of a circular fitting hole of a large end portion and/or a small end portion of the connecting rod, is inserted and fitted, as an inner member, inside the inner surface of the fitting hole, a substantially tapered surface which is defined by an outer circumferential surface of an end portion of a disc-like rotary pressing portion of a rotary pressing tool, as seen in an axial direction thereof and a moving direction thereof, that has an outer diameter D smaller than an inner diameter of the fitting hole and larger than an inner diameter of the cylindrical formed body and has a thickness T not more than $0.3 \times D$, and which is pressed, while being rotated, to an end surface of the cylindrical formed body in the axial direction so as to heat and soften, by friction, the cylindrical formed body, and the rotary pressing portion is moved in the axial direction while the rotary pressing portion is rotated and an other portion of the rotary pressing tool than the rotary pressing portion is not contacted with the cylindrical formed body, so as to cause the cylindrical body formed of the bearing metal material to plastically flow in the same direction as the axial direction and a radially outward direction, whereby a bearing metal layer is directly joined and formed on the inner surface of the fitting hole.

According to a second aspect of the invention, a plurality of said connecting rods are stacked on each other such that respective centerlines of the respective fitting holes thereof coincide with each other, the cylindrical body formed of the bearing metal material that has a length corresponding to a sum of respective lengths of the respective fitting holes in the axial direction is inserted in each of the respective fitting holes of the connecting rods so as to be located in said each fitting hole, the rotary pressing tool is moved in the axial direction while being rotated, whereby the bearing metal layer is directly joined and formed on the respective inner surfaces of the respective fitting holes of the connecting rods, and subsequently the connecting rods are separated from each other.

Yet a third aspect of the invention relates to a connecting rod with a bearing or bearings, and is characterized in that on an inner surface of a circular fitting hole of a large end portion and/or a small end portion of the connecting rod, a cylindrical bearing metal layer is directly joined and formed by causing a bearing metal material to plastically flow due to heat generated by friction and under pressure.

According to the main aspect of the invention, the cylindrical body formed of the bearing metal material is inserted and fitted, as the inner member, inside the inner surface of the circular fitting hole of the connecting rod, and the disc-like rotary pressing portion of the rotary pressing tool, more specifically described, the tapered surface as the outer circumferential surface of the disc-like rotary pressing portion in the axial direction thereof and the moving direction thereof is pressed, while being rotated, to the end surface of the cylindrical formed body of the bearing metal material in the axial direction, so as to heat and soften, by friction, the pressed portion of the cylindrical formed body, and the rotary pressing portion is moved in the axial direction while the rotary pressing portion is rotated and the other portion of the rotary pressing tool than the rotary pressing portion is not contacted with the cylindrical formed body, so as to cause the cylindrical formed body to plastically flow in the same direction as the axial direction and a radially outward direction, whereby the bearing metal layer is directly joined and formed on the inner surface of the fitting hole of the connecting rod.

Thus, in the present producing method, the rotary pressing tool, in particular, the tapered surface of the disc-like rotary pressing portion thereof is pressed, while being rotated, against the bearing metal material inserted inside the inner surface of the fitting hole, so as to heat and soften, by friction, the metal material and thereby cause the same to plastically flow, whereby the bearing metal layer is directly joined and formed on the inner surface of the fitting hole. Therefore, it is not needed to separately produce the con rod bearings each consisting of the back metal and the bearing metal, in the conventional method including the many steps. In addition, it is not needed to assemble the con-rod bearings with the connecting rod. Thus, the steps of the method of producing the connecting rod with the bearing or bearings can be reduced, and the cost needed to produce the rod can be decreased.

In addition, the bearing metal layer formed in this way is strongly bonded to the inner surface of the fitting hole, and accordingly is freed of the above-described problems with the conventional method wherein the con rod bearings and the connecting rod are assembled with each other after they have been produced separately from each other.

Moreover, in the present producing method, an area by which the outer circumferential surface of the rotary pressing tool contacts the bearing metal material can be minimized. Therefore, problems such as the occurrence of seizure at the contact area can be avoided. In addition, the bearing metal layer can be formed on the inner surface of the fitting hole, such that the thickness of the metal layer is uniform in the axial direction.

In addition, the present method does not need the back metals each having the thickness of from 1 mm to 1.5 mm that are used in the conventional method. Therefore, the size and weight of the connecting rod as a whole can be reduced, which contributes to improving an output power and a fuel consumption of an engine for an automotive vehicle. Moreover, since the back metals are not needed, a thermal conductivity and a heat radiating capability of the connecting rod are increased, which additionally contributes to improving the output power of the engine.

According to the second aspect of the invention, a plurality of connecting rods are stacked on each other such that respective centerlines of the respective fitting holes thereof coincide with each other, the cylindrical body formed of the bearing metal material that has the length corresponding to the sum of the respective lengths of the fitting holes in the axial direction is inserted into each of the fitting holes of the connecting rods so as to be located in the each fitting hole, the rotary pressing tool is moved in the axial direction while being rotated, whereby the bearing metal layer is directly joined and formed on the respective inner surfaces of the respective fitting holes of the connecting rods, and subsequently the connecting rods are separated from each other. In the present producing method, the bearing metal layers can be efficiently joined and formed on the respective inner surfaces of the respective fitting holes of the multiplicity of connecting rods.

Therefore, the present producing method is particularly advantageous for a mass production of the connecting rods.

A third aspect of the invention relates to the connecting rod with the bearing or bearings, wherein on the inner surface of the circular fitting hole of the large end portion and/or the small end portion of the connecting rod, the cylindrical bearing metal layer is directly joined and formed by causing the bearing metal material to plastically flow due to the heat generated by the friction and under the pressure. Thus, the connecting rod with the bearing or bearings does not include any back metals. Therefore, the size and weight of the connecting rod as a whole can be reduced and consequently the output power and the fuel consumption of the engine for the automotive vehicle can be improved. Moreover, since the back metals are not used, the thermal conductivity of the connecting rod can be improved, and accordingly the heat radiating capability thereof can be improved.

Since the bearing metal layer is strongly joined to the inner surface of the fitting hole due to the heat produced by the friction and the pressure applied thereto, the metal layer is freed of a problem that it may peel from the inner surface of the fitting hole.

DETAILED DESCRIPTION OF THE INVENTION

Hereinafter, there will be described embodiments of the present invention in detail by reference to the drawings.

Figure 1:
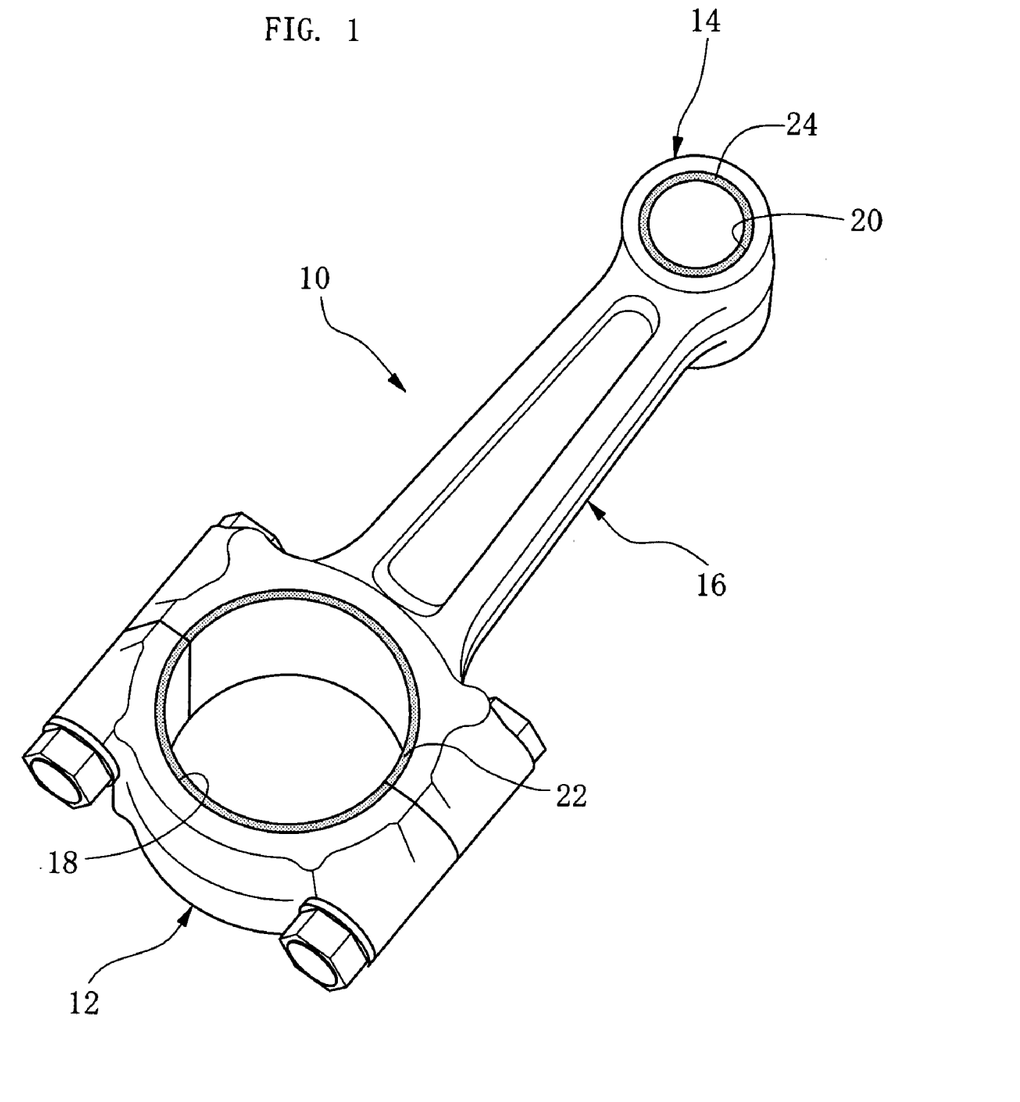
FIG. 1 is a view of a connecting rod with bearings (i.e., bearing metal layers) as one example according to the present invention.

In FIG. 1, reference numeral 10 designates a connecting rod including a large end portion 12, a small end portion 14, and a rod portion 16 located between the two end portions 12, 14.

The large end portion 12 has a large end hole 18 (i.e., a fitting hole) in which a crank pin fits, and the small end portion 14 has a small end hole 20 (i.e., a fitting hole) in which a piston pin fits. Thus, the crank pin is connected to the large end portion 12 such that the crank pin rotatably fits in the large end hole 18, and the piston pin is connected to the small end portion 14 such that the piston pin rotatably fits in the small end hole 20.

On an inner surface of the large end hole 18, a bearing metal layer 22 having a corresponding cross-sectional shape and having a cylindrical shape with a small wall thickness, is directly joined and formed; and on an inner surface of the small end hole 20, a bearing metal layer 24 having a corresponding cross-sectional shape and having a cylindrical shape with a small wall thickness is directly joined and formed. Thus, the crank pin is connected to the large end portion 12 via the bearing metal layer 22 such that the crank pin rotatably fits in the large end hole 18, and the piston pin is connected to the small end portion 14 via the bearing metal layer 24 such that the piston pin rotatably fits in the small end hole 20.

The large end portion 12 is constituted by two half portions that are fastened to each other with bolts and nuts.

Figure 2:
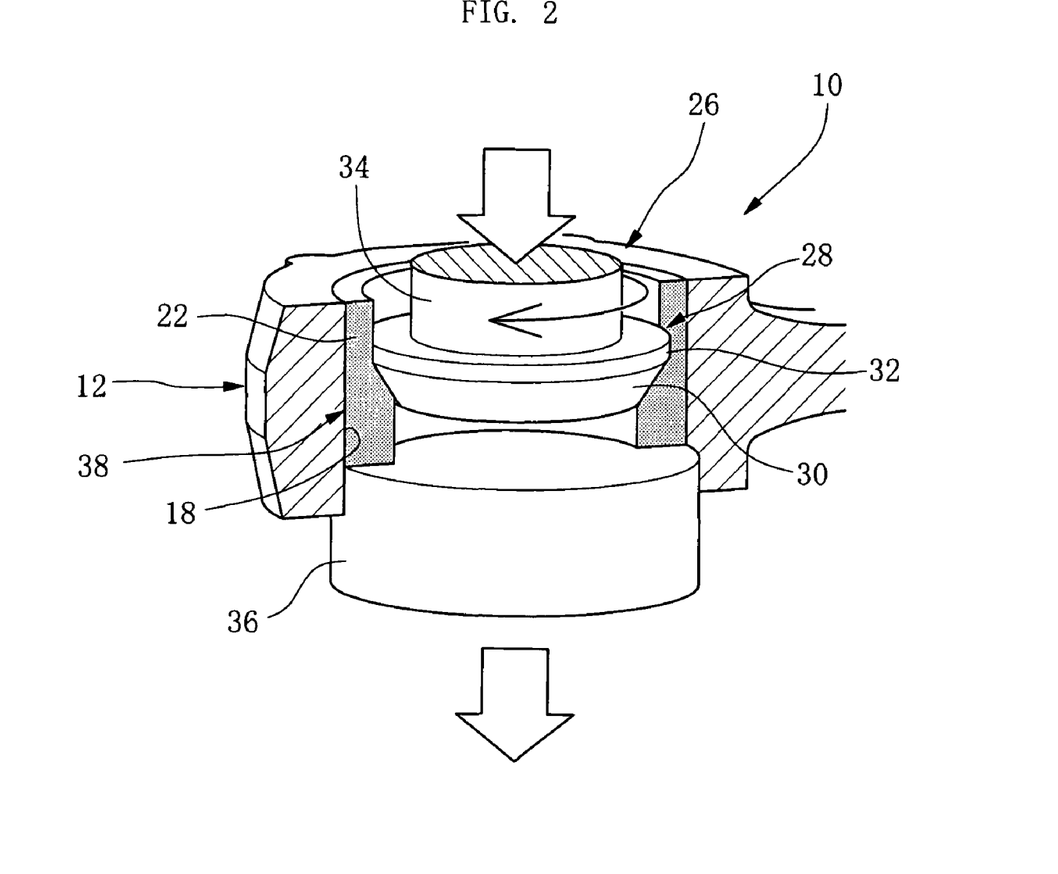
FIG. 2 is a view for explaining a relevant step of a method of forming the bearing metal layer shown in FIG. 1, as one embodiment of the present invention.
Figure 3:
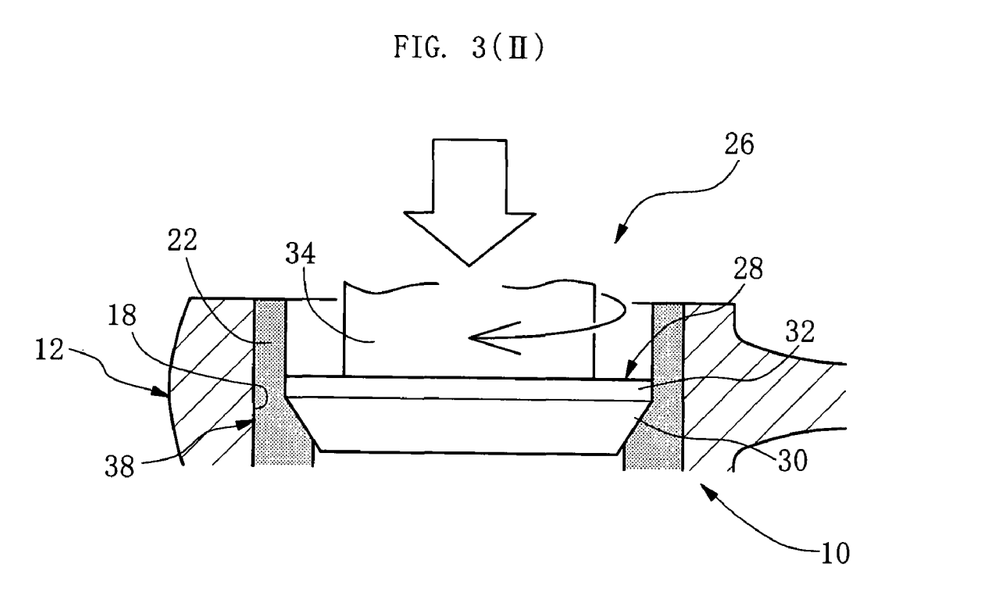
FIG. 3 is a view for explaining the method of forming the bearing metal layer.

FIGS. 2 and 3 illustrate a method of forming the bearing metal layer 22 on the inner surface of the large end hole 18.

Since a method of forming the bearing metal layer 24 on the side of the small end portion 14 is basically identical with the method of forming the bearing metal layer 22, the following description relates to only the method of forming the bearing metal layer 22 on the side of the large end portion 12.

In FIG. 2, reference numeral 26 designates a rotary pressing tool including, as a main portion thereof, a disc-like rotary pressing portion 28.

The rotary pressing portion 28 has a tapered surface 30 defined by an outer circumferential surface of an end portion thereof as seen in an axial direction thereof and a moving direction thereof (i.e., a downward direction as seen in the figure).

The rotary pressing tool 26, i.e., the tapered surface 30 of the disc-like rotary pressing portion 28 thereof heats, by friction, a cylindrical formed body 38 (whose wall has a thickness of from about 1 mm to about 5 mm) that is formed of a bearing metal material, described later, and presses the same 38 in the downward direction as seen in the figure and a radially outward direction so that the bearing metal material plastically flows.

The disc-like rotary pressing portion 28 additionally has, on an upper side of the tapered surface 30 as seen in the figure, an inner-diameter defining surface 32 that is continuous with the tapered surface 30 and extends straight parallel to the axial direction over a small dimension (i.e., a small length).

The inner-diameter defining surface 32 defines an inner diameter of the bearing metal layer 22, described later. However, the straight, inner-diameter defining surface 32 may be omitted according to circumstances.

A relationship between a diameter D and a thickness T of the disc-like rotary pressing portion 28 is as follows: T/D 0.3.

Reference numeral 34 designates a connection portion of the rotary pressing tool 26 that connects between the disc-like rotary pressing-portion 28 and a rotating and pressing device. The connection portion 34 does not constitute a working portion. Therefore, an outer diameter of the connection portion 34 is made small enough to assure that when the rotary pressing tool 26 works the cylindrical formed body 38, the connection portion 34 is not brought into contact with the same 38.

Reference numeral 30 designates a back-up member.

Figure 3I:
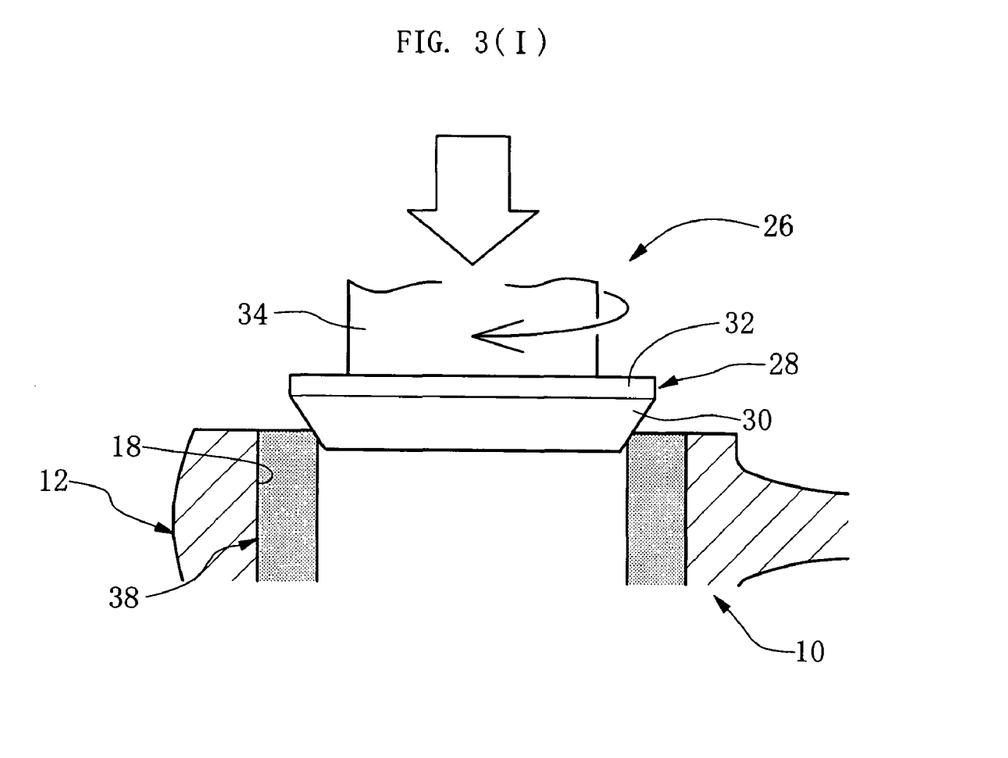

In the present embodiment, as shown in FIG. 3(I), the bearing metal material given as the cylindrical formed body 38 is inserted and fitted, as an inner member, inside the inner surface of the large end hole 18.

Subsequently, as shown in FIG. 3(II), the disc-like rotary pressing portion 28 of the rotary pressing tool 26 connected to the rotating and pressing device, more specifically described, the tapered surface 30 of the same 28 is pressed, while being rotated, against an upper end surface of the cylindrical formed body 38 as seen in the figure, so that the cylindrical formed body 38, i.e., the bearing metal material is heated and softened by the heat generated by the friction between the surface 30 and the body 38.

The outer diameter of the disc-like rotary pressing portion 28 is smaller than an inner diameter of the large end hole 18, and is larger than an inner diameter of the cylindrical formed body 38.

In the present embodiment, the rotary pressing tool 26, i.e., the disc-like rotary pressing portion 28 thereof is pressed in the axial direction thereof, i.e., the downward direction as seen in the figure, while the pressing portion 28 is rotated and the back-up member 36 is moved in the same direction, so that the bearing metal material plastically flows in both the same axial direction as the moving direction, and the radially outward direction.

Thus, the cylindrical, bearing metal layer 22 is directly and firmly formed and joined on the circular inner surface of the large end hole 18.

Figure 4:
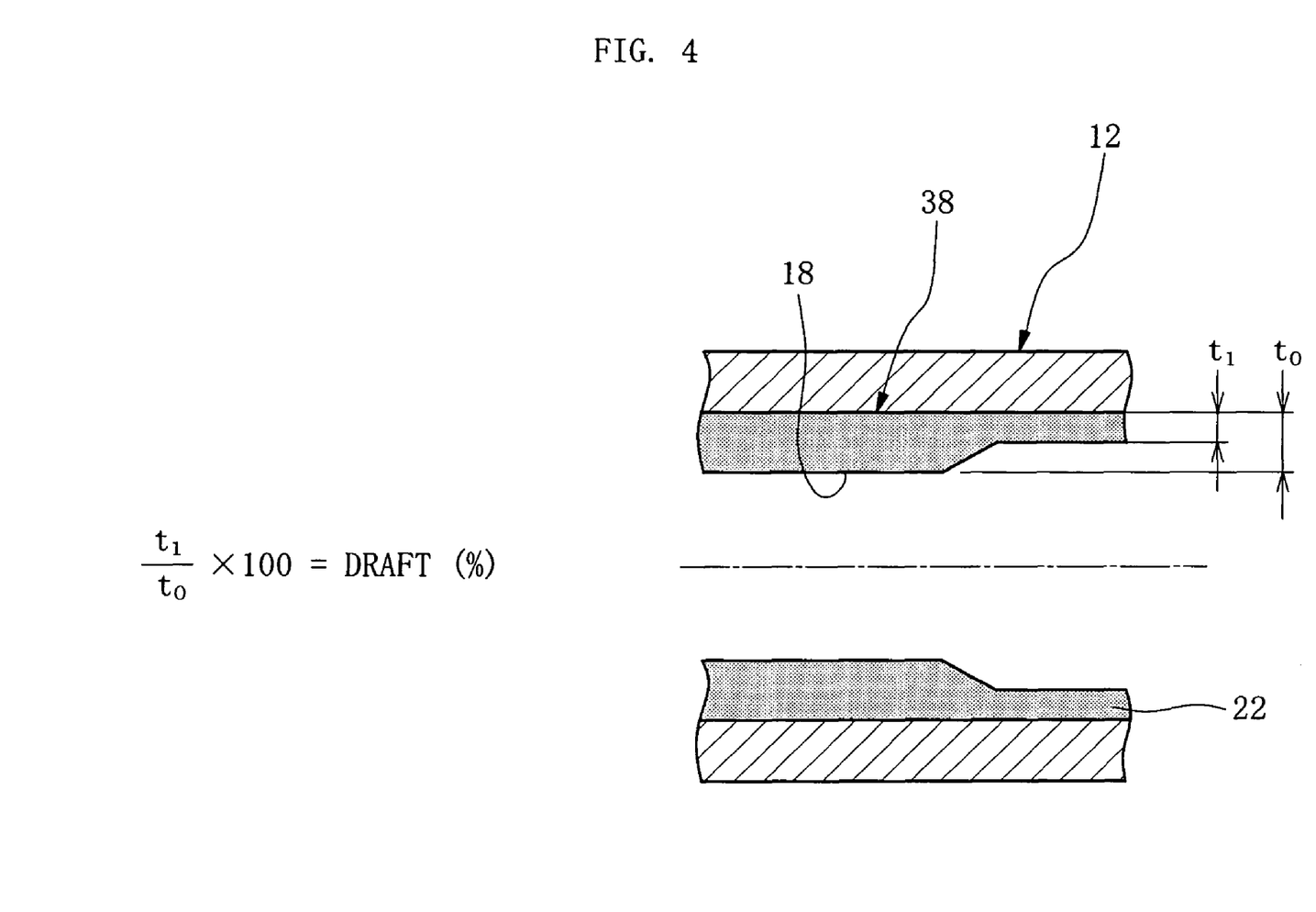
FIG. 4 is a view for explaining a draft employed in the method of forming the bearing metal layer.

Preferably, a draft of the cylindrical formed body 38 worked by the rotary pressing portion 28 is not less than 7%.

This draft is defined as (t1/t0)×100(%), where t0 is an initial thickness of the wall of the cylindrical formed body 38 and t1 is an after-working thickness of the wall of the same 38, as shown in FIG. 4.

This draft is analogous with a draft of a plate material worked by, e.g., rolling.

When the cylindrical formed body 38 is worked at the draft of not less than 7%, the bearing metal layer 22 can be advantageously pressed and joined on the inner surface of the large end hole 18.

Figure 5A:
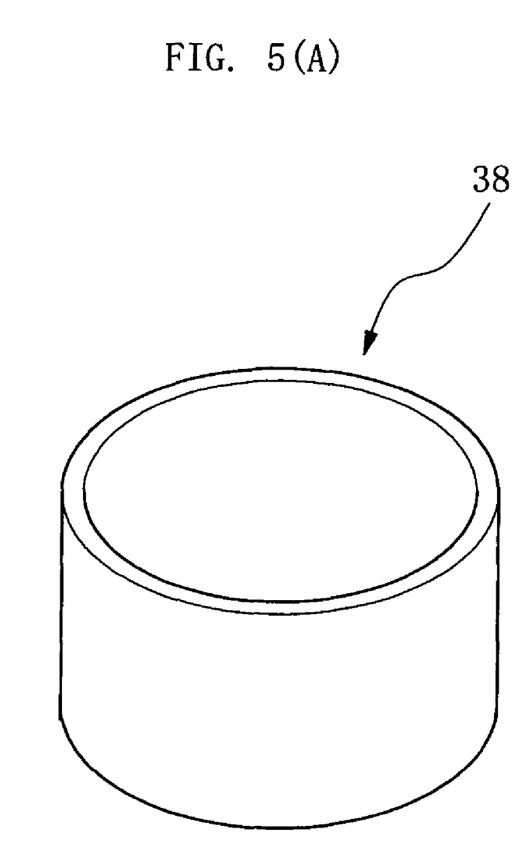
FIG. 5 is a view of examples of a cylindrical body formed of a bearing metal material, employed in the method of forming the bearing metal layer.

In the present embodiment, it is preferred to use, as the cylindrical formed body 38, a cylindrical body, shown in FIG. 5(A), that has such a cylindrical shape that is seamlessly continuous in a circumferential direction thereof in a state before it is inserted inside the inner surface of the large end hole 18.

The cylindrical formed body 38 having the cylindrical shape seamlessly continuous in the circumferential direction may be formed by any of various working methods, such as casting, drawing, or extruding.

Figure 5B:
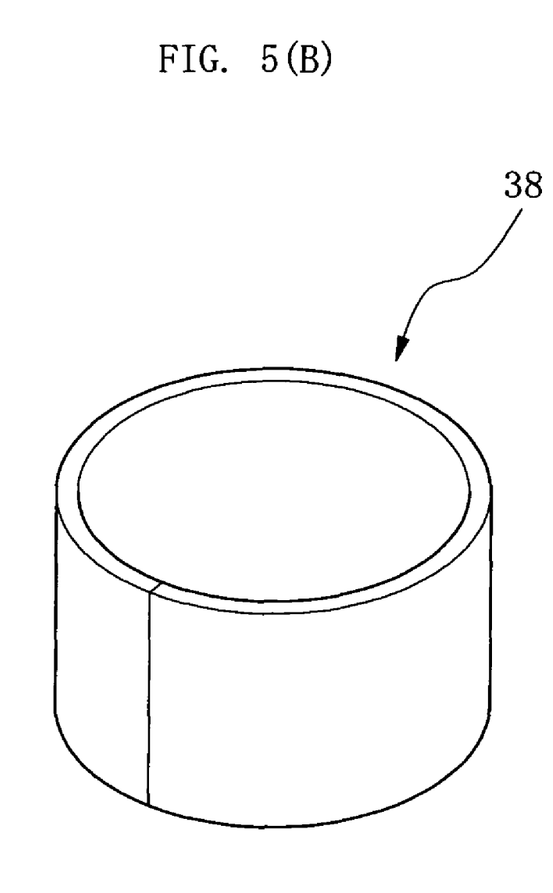

Alternatively, it is possible to use, as the cylindrical formed body 38, a cylindrical body, shown in FIG. 5(B), that is formed by curving a plate into a cylindrical shape.

Even in the latter case, when the cylindrical formed body 38 is worked by the rotary pressing tool 26, the bearing metal layer 22 is formed to have such a cylindrical shape that is seamlessly continuous in a circumferential direction thereof.

Here, it is possible to use, as the bearing metal material, a cast body, a sintered powder, a mechanical alloy, a rolled material, an expanded material, etc.

In particular, in the case where, e.g., the sintered powder or the cast body has a composition to have a specific function, its embrittlement may lead to, e.g., fracture during a subsequent working operation. However, in the present method, heating by friction causes plastic flowing and accordingly fracture or separation does not occur.

Moreover, the present method enjoys a high grain-refining effect.

It is preferred to use, as the bearing metal material, an Al-based alloy or a Cu-based alloy.

The Al-based alloy may be an Al—Sn alloy or an Al—Bi alloy.

On the other hand, the Cu-based alloy may be a Cu—Sn alloy.

The connecting rod 10 per se may be produced by any of various methods such as casting, forging, or sintering.

A preferred material for the connecting rod 10 is a carbon steel such as S55C, a chrome molybdenum steel (i.e., a mechanical or structural steel) such as SCM435, a titanium alloy (e.g., Ti-6Al-4V), or an aluminum alloy.

The rotary pressing tool 26, in particular, the rotary pressing portion 28 thereof is formed of a material whose melting point is higher than that of the bearing metal material, and a maximum outer diameter of the rotary pressing portion 28 is made smaller than the inner diameter of the large end hole 18, as described above.

A thickness of the bearing metal layer 22 joined and formed on the inner surface of the large end hole 18 is selected depending upon a difference of the inner diameter of the large end hole 18 and the outer diameter of the rotary pressing portion 28. The thickness of the bearing metal layer 22 can be arbitrarily changed by changing the outer diameter of the rotary pressing portion 28.

Preferably, the thickness of the bearing metal layer 22 ranges from about 0.5 mm to about 1.5 mm.

When the bearing metal layer 22 is formed, it is preferred to control temperatures such that the connecting rod 10 is pre-heated to improve a degree of bonding of the metal layer 22 to the rod 10 or such that the metal layer 22 is cooled by water when an excessively large amount of heat is generated.

The durability of the rotary pressing tool 26, in particular, the rotary pressing portion 28 thereof can be effectively increased by subjecting a tool steel to a surface reforming such as a quenching or annealing heat treatment, a plasma powder cladding welding, or a metal spraying.

In addition, in the case where the rotary pressing tool 26 is cooled by a cooling water flowing therethrough, the durability thereof can be effectively increased.

In the present embodiment, an appropriate temperature at an interface of the rotary pressing portion 28 and the bearing metal material falls in a range from the melting point of the bearing metal material to a temperature lower than the melting point by about 100° C. However, regarding a material wherein a difference of respective temperatures of solid and liquid phases is judged to be large from a phase diagram, melting of a portion thereof raises no problem.

In the case where the inner diameter of the large end hole 18 is about 50 mm, good results are obtained when the rotary pressing portion 28 is revolved at a speed not higher than about 1,500 rpm. As the size of the end hole 18 decreases, an appropriate revolution speed of the pressing portion 28 changes to a higher range.

The tapered surface 30 of the rotary pressing portion 28 may not be a strictly defined tapered surface so long as the diameter of the surface 30 gradually increases in a direction (i.e., an upward direction as seen in the figure) from a front end thereof toward a rear end thereof as seen in the moving direction. For example, the tapered surface 30 may be a somewhat curved surface.

As shown in FIG. 6, the rotary pressing tool 26 may be used to heat, by friction, the cylindrical formed body 38 and thereby cause the same 38 to plastically flow, in such a manner that first the tapered surface 30 of the rotary pressing portion 28 is pressed, at a low pressure, against the upper end surface of the cylindrical formed body 38 so as to heat, by friction, the formed body 38, and then a large thrust is applied to the pressing portion 28 in the axial direction thereof so as to cause the formed body 38 to plastically flow.

In FIG. 6, an axis of abscissas indicates time, and an axis of ordinates indicates pressure applied from the rotary pressing portion 28 to the cylindrical formed body 38.

Figure 6A:
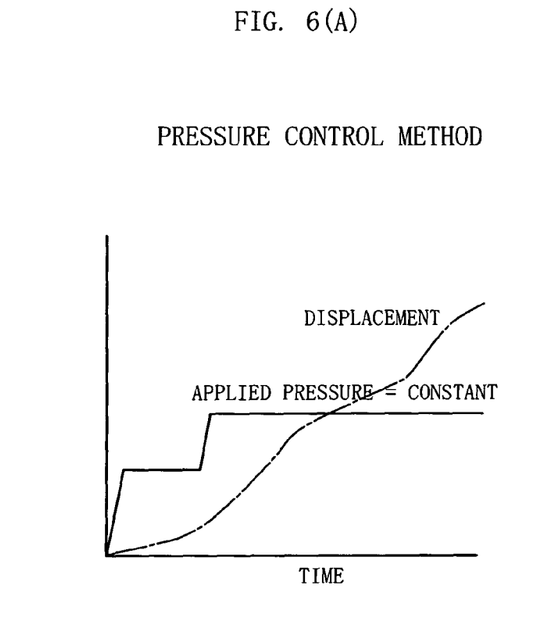
FIG. 6 is a view for explaining control methods employed in the method of forming the bearing metal layer.
Figure 6B:
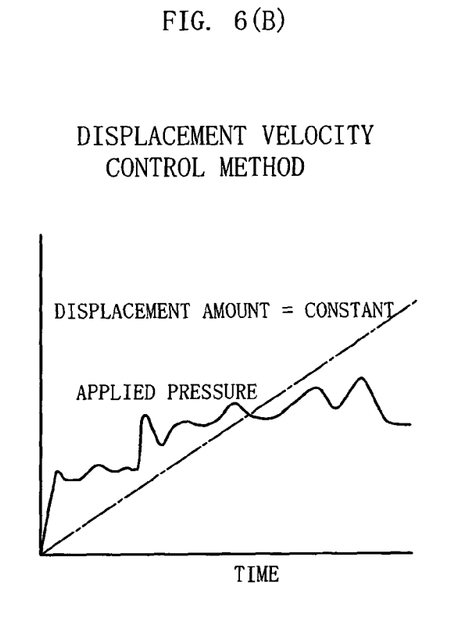
Figure 6C:
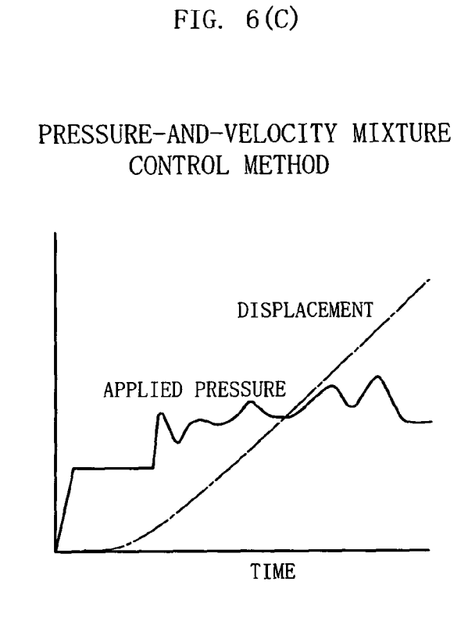

FIG. 6(A) shows a pattern for a case where a working operation is performed while the pressure is controlled to be constant; FIG. 6(B) shows a pattern for a case where a working operation is performed while the displacement of the rotary pressing portion 28 is controlled to be constant; and FIG. 6(C) shows a pattern for a case where a working operation is performed while the pressure and the displacement of the pressing portion 28 are controlled in a mixed manner.

Figure 7:
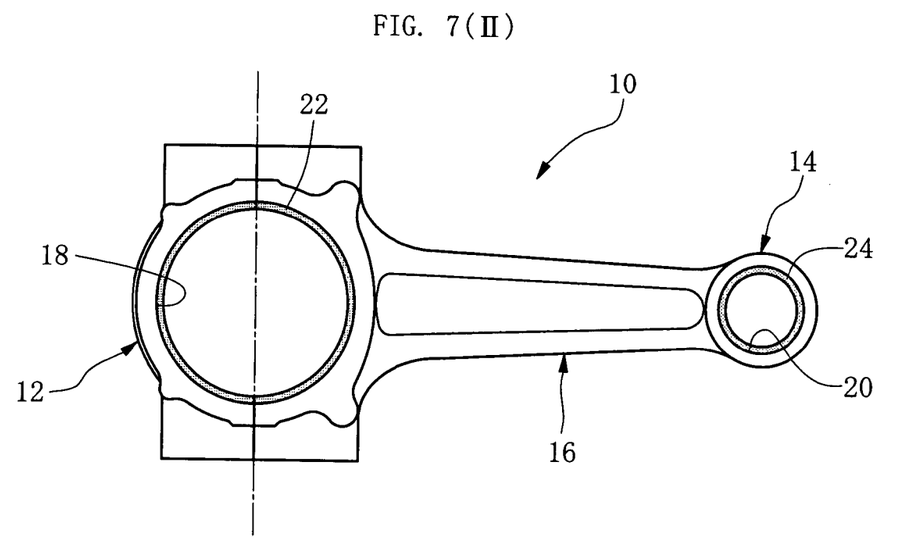
FIG. 7 is a view for explaining a step of working the connecting rod after the bearing metal layers have been formed.
Figure 7I:
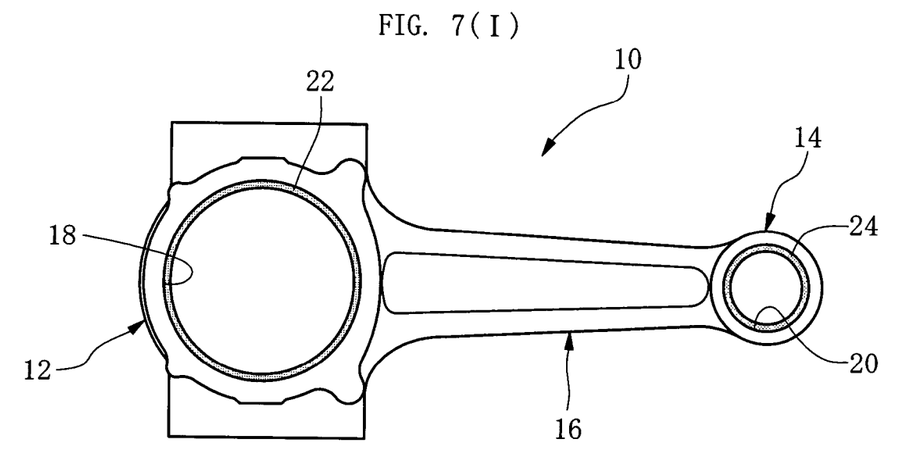

After the bearing metal layer 22 has been formed on the inner surface of the large end hole 18 and the bearing metal layer 24 has been formed on the inner surface of the small end hole 20, in the above-described manner (FIG. 7(I)), the large end portion 12 is divided into two half portions, as shown in FIG. 7(II). When the crank pin is assembled with the large end portion 12, those two half portions are fastened to each other with bolts and nuts, so that the two half portions are integral with each other.

Thus, in the present producing method, the rotary pressing tool 26, in particular, the tapered surface 30 of the disc-like rotary pressing portion 28 is pressed, while being rotated, against the cylindrical formed body 38 inserted inside the inner surface of the large end hole 18 so as to heat and soften, by friction, the formed body 38 and thereby cause the same 38 to plastically flow, whereby the bearing metal layer 22 is directly joined and formed on the inner surface of the large end hole 18. Therefore, it is not needed to separately produce the con-rod bearings each consisting of the back metal and the bearing metal, in the conventional method including the many steps. In addition, it is not needed to assemble the con-rod bearings with the connecting rod 10. Thus, the steps employed by the method of producing the connecting rod with the bearings can be reduced, and the cost needed to produce the connecting rod with the bearings can be decreased.

In addition, the bearing metal layer 22 formed in this way is more strongly bonded to the inner surface of the large end hole 18, as compared with the case where the con rod bearing and the connecting rod are assembled with each other after they are produced separately from each other.

Moreover, in the present producing method, an area by which the outer circumferential surface of the rotary pressing tool 26 contacts the bearing metal material can be minimized. Therefore, problems such as the occurrence of seizure at the contact area can be avoided. In addition, the bearing metal layer 22 can be formed on the inner surface of the large end hole 18, such that the metal layer 22 has a constant thickness in the axial direction of the end hole 18.

In addition, the present method does not need the back metals each having the thickness of from about 1 mm to about 1.5 mm that are used for the con rod bearings in the conventional method. Therefore, the size and weight of the connecting rod 10 as a whole can be reduced, which contributes to improving an output power and a fuel consumption of an engine for an automotive vehicle. Furthermore, since the back metals are not needed, a thermal conductivity and a heat radiating capability of the connecting rod 10 are improved, which additionally contributes to improving the output power of the engine.

Figure 8:
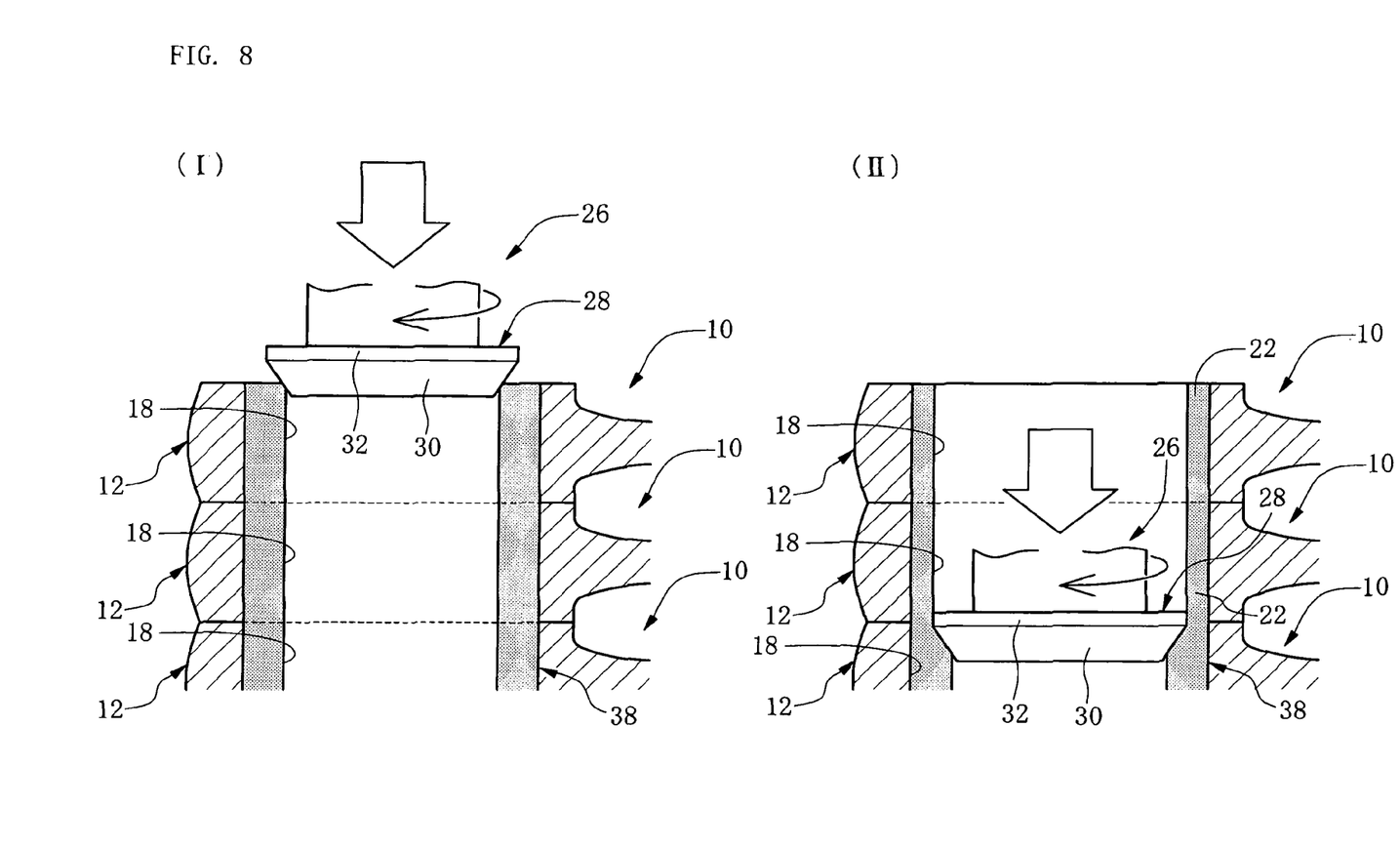
FIG. 8 is a view for explaining another method of forming a bearing metal layer, as another embodiment of the present invention.

FIG. 8 shows another embodiment of the present invention.

In the present embodiment, a plurality of connecting rods 10 are stacked on each other such that respective centerlines of respective large end holes 18 thereof coincide with each other, and a cylindrical body 38 formed of a bearing metal material and having a length corresponding to a sum of respective lengths of the large end holes 18 as measured in respective axial directions thereof is inserted in each of the large end holes 18 so as to be located in the each large end hole 18. In this state, the rotary pressing tool 26 is moved in the axial direction thereof, while being rotated, so that a bearing metal layer 22 is directly and continuously joined and formed on the respective inner surfaces of the respective large end holes 18 of the connecting rods 10, and then the connecting rods 10 are separated from each other so as to have the respective bearing metal layers 22.

In the present producing method, the bearing metal layers 22 can be efficiently joined and formed on the respective inner surfaces of the respective large end holes 18 of the multiplicity of connecting rods 10.

Therefore, the present producing method is particularly advantageous for a mass production of the connecting rods 10.

FIG. 9 shows comparative examples in contrast to the above-described embodiments of the present invention.

Figure 9A:
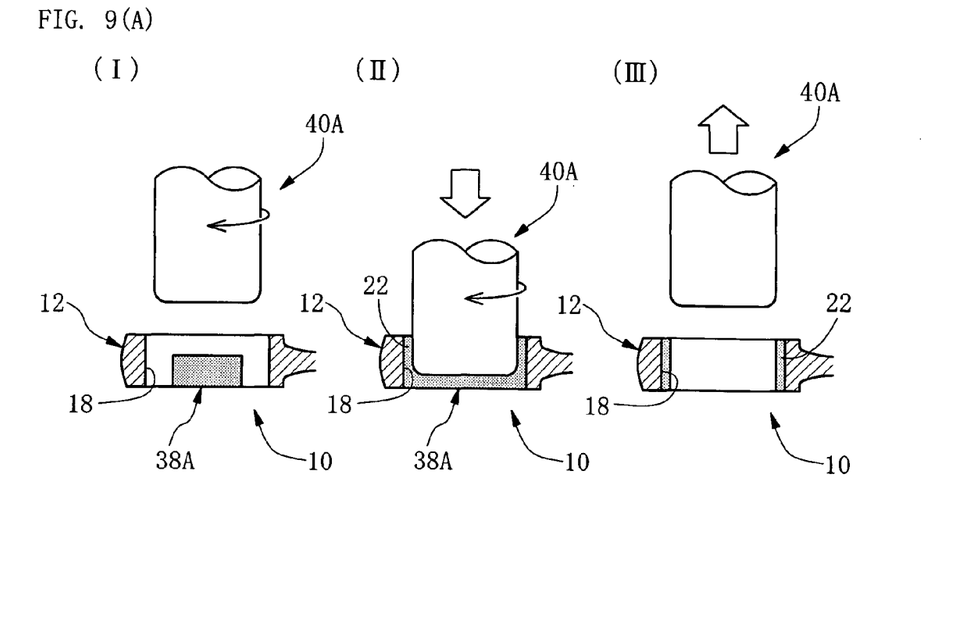
FIG. 9 is a view for explaining a comparative example with which each of the embodiments of the present invention is compared.
Figure 9B:
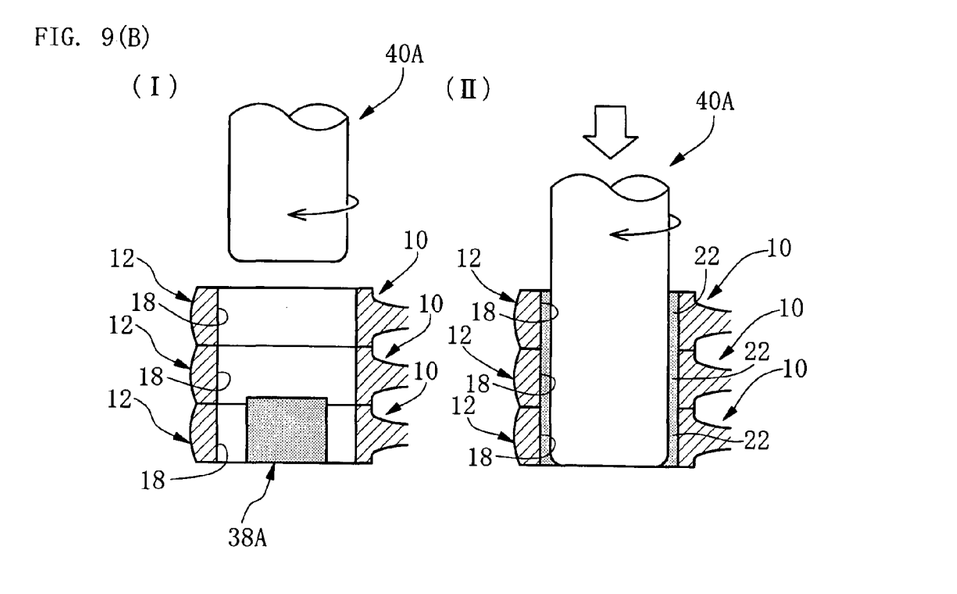

FIG. 9(A) shows an example where a bearing metal layer 22 is formed on an inner surface of a large end hole 18 of a single connecting rod 10; and FIG. 9(B) shows an example where a bearing metal layer 22 is continuously formed on respective inner surfaces of respective large end holes 18 of a plurality of connecting rods 10 that are stacked on each other.

In those comparative examples, a bearing metal material 38A in the form of a block is set at a bottom of an inner space of the large end hole or holes 18, and a cylindrical pressing rod 40A is inserted, while being rotated, into the large end hole or holes 18. An advancing movement of the cylindrical pressing rod 40A in a downward direction as seen in the figure results in pressing the bearing metal material 38A, and the rotation of the pressing rod 40A heats and softens, by friction, the metal material 38A, whereby the metal material 38A is plastically flowed and is pressed (i.e., caused to creep) in an upward direction as seen in the figure from the bottom into a small clearance left between an outer circumferential surface of the pressing rod 40A and the inner surface or surfaces of the large end hole or holes 18. Thus, the bearing metal layer 22 is formed on the inner surface or surfaces of the large end hole or holes 18.

However, in the comparative examples, when the bearing metal material 38A is heated and softened and plastically flows upward into the small clearance between the outer surface of the pressing rod 40A and the inner surface or surfaces of the end hole or holes 18, the metal material 38A cannot smoothly flow upward along the small clearance because of, e.g., a resistance produced by the friction thereof with the outer surface of the pressing rod 40A or the inner surface or surfaces of the end hole or holes 18. In addition, since the temperature of the metal material 38A gradually lowers, the resistance exerted to the metal material 38A is amplified. Thus, it may be difficult to form the bearing metal layer 22 having a sufficient height (i.e., a sufficient length in the axial direction thereof). Moreover, there may occur another problem that the bearing metal layer 22 is excessively thick in a lower portion thereof and is excessively thin in an upper portion thereof, i.e., the thickness of the metal layer 22 is not sufficiently uniform.

In addition, in the comparative examples, an entire outer circumferential surface, i.e., a large area of the pressing rod 40A is brought into frictional contact with the inner surface of the bearing metal material 38A or the bearing metal layer 22. Therefore, the heat generated by this frictional contact may cause seizure and thereby make it difficult to easily form and join the bearing metal layer 22.

In particular, in the example, shown in FIG. 9(B), where the bearing metal layer 22 is formed in the state in which the plurality of connecting rods 10 are stacked on each other, the above-identified problems may emerge clearly.

In contrast, the above-described embodiments of the present invention are free of those problems and assure that the bearing metal layer 22 is easily formed and joined on the inner surface or surfaces of the large end hole or holes 18.

While the present invention has been described in detail in its embodiments, it is to be understood that the invention is not limited to the details of the described embodiments but may be embodied with various changes without departing from the spirit of the invention.

The invention claimed is:

1. A method of producing a connecting rod with a bearing or bearings, comprising inserting and fitting a cylindrical formed body which is formed, in advance, of a bearing metal material into a cylindrical shape having a cross-sectional shape corresponding to a circular inner surface of a circular fitting hole of a large end portion and/or a small end portion of the connecting rod, as an inner member, inside the inner surface of the fitting hole, pressing a substantially tapered surface which is defined by an outer circumferential surface of an end portion of a disc-like rotary pressing portion of a rotary pressing tool, as seen in an axial direction thereof and a moving direction thereof, that has an outer diameter D smaller than an inner diameter of the fitting hole and larger than an inner diameter of the cylindrical formed body and has a thickness T not more than 0.3×D, and which has a smallest diameter smaller than the inner diameter of the cylindrical formed body, while being rotated, to an end surface of the cylindrical formed body in the axial direction so as to heat and soften, by friction, the cylindrical formed body, and moving the rotary pressing portion in the axial direction while the rotary pressing portion is rotated and an other portion of the rotary pressing tool than the rotary pressing portion is not contacted with the cylindrical formed body, so as to cause the cylindrical body formed of the bearing metal material to plastically flow in the same direction as the axial direction and a radially outward direction, whereby a bearing metal layer is directly joined and formed on the inner surface of the fitting hole.

2. The method according to claim 1, wherein a plurality of said connecting rods are stacked on each other such that respective centerlines of the respective fitting holes thereof coincide with each other, the cylindrical body formed of the bearing metal material that has a length corresponding to a sum of respective lengths of the respective fitting holes in the axial direction is inserted in each of the respective fitting holes of the connecting rods so as to be located in said each fitting hole, the rotary pressing tool is moved in the axial direction while being rotated, whereby the bearing metal layer is directly joined and formed on the respective inner surfaces of the respective fitting holes of the connecting rods, and subsequently the connecting rods are separated from each other.

* * * * *